United States Patent [19]

Elings et al.

[11] 4,404,645

[45] Sep. 13, 1983

[54] CORRELATOR

[76] Inventors: Virgil B. Elings, P.O. Box 6463, Santa Barbara, Calif. 93111; David F. Nicoli, 448 Mills Way, Goleta, Calif. 93017

[21] Appl. No.: 179,036

[22] Filed: Aug. 18, 1980

[51] Int. Cl.³ .............................................. G06F 15/34
[52] U.S. Cl. ..................................... 364/728; 364/555
[58] Field of Search ............... 364/604, 728, 824, 485, 364/555

[56] References Cited

U.S. PATENT DOCUMENTS

| | | | |
|---|---|---|---|
| 3,626,168 | 12/1971 | Norsworthy | 364/728 |
| 3,842,252 | 10/1974 | Takeman et al. | 364/728 X |
| 3,983,379 | 9/1976 | Scott | 364/485 |
| 4,035,802 | 7/1977 | Tagermalm et al. | 364/728 X |
| 4,158,234 | 6/1979 | Grandchamp | 364/728 X |
| 4,161,033 | 7/1979 | Martinson | 364/728 |

*Primary Examiner*—Felix D. Gruber
*Attorney, Agent, or Firm*—Charles H. Schwartz; Ellsworth R. Roston

[57] ABSTRACT

A correlator for producing a correlation function by processing input data over a large number of coefficients of the correlation function by time sharing a smaller number of correlation channels, including a temporary storage device for receiving input data and for providing the input data as output data at particular successive time delay intervals relative to the input data, a group channel correlator responsive to the output data from the temporary storage device and to additional data for correlating the group of channels of data and for providing output sums representing coefficients of the correlation function, and means coupled to the temporary storage device and the group channel correlator for controlling the coupling of the output data from the temporary storage device to the group channel correlator to have the output data at the successive time delay intervals coupled to the group channel correlator to have the group channel correlator repetitively correlate successive groups of channels for providing the large number of coefficients in the correlation functions built up from the repetitive correlation of the successive groups of channels.

24 Claims, 16 Drawing Figures

The present invention relates to a correlator and more specifically to a correlator which includes time sharing of a small number of channels of electronic processing equipment so as to produce a correlation function with a large number of coefficients.

Generally, each coefficient of the correlation function includes the following general calculation:

$$C(\tau) = \sum_{0}^{T} I(t) \cdot I'(t + \tau)$$

where T is the running time and I and I' are the measured quantities. For a cross-correlator, I and I' are measurements from separate quantities so as to provide for the cross correlation between the measurements from the separate quantities. For an auto correlator, I equals I' so that in an auto correlator the device provides for multiplying the measured quantity times itself but shifted in time by the amount $\tau$. The correlator provided in the present invention may be used as either a cross correlator or an auto correlator.

One specific purpose of the present invention is its use as an auto correlator so as to provide for determining the size of particles in solution from their Brownian motion. Generally, particles which are suspended in a solvent may have a determination of the average size of the particles based on an analysis of fluctuations in the intensity of light scattered by the particles when the particles are illuminated by a coherent light source such as by a laser. By using a particular example, it may be desirable to produce a correlation function $C(\tau)$ for various values of $\tau$ which represents a number of correlation coefficients and as a particular example, the correlation function may be calculated for a number of coefficients such as 64 coefficients, one coefficient for every value of $\tau$.

In one prior art method of producing the correlation function, the calculation for producing the correlation function is provided on all of the channels such as 64 channels simultaneously and with all of the channels separated by the same amount of time referred to as a period $\Delta\tau$. Generally, the prior art device may include a 64-position shift register and with a separate output provided at each position for each channel. The calculations are then provided on each channel and controlled in accordance with a particular clock rate. The particular clock rate is defined as $1/\Delta\tau$ and represents the inverse of the period $\Delta\tau$.

In the prior art device described above, 64 multipliers are provided to have one for each output channel. In an auto correlation configuration each multiplier multiplies the present input to the shift register, times the inputs which existed during the previous 64 periods which are represented individually at each separate output from the shift register. The multiplications therefore form the 64 products between the present input and the inputs during the previous 64 periods. Following the multipliers are 64 adders which individually add the results from each multiplier into 64 on-going sums. These sums represent the 64 coefficients of the correlation function. After the calculations are provided in all 64 channels the data in the shift register are moved by one position and with the data at the 64th position thrown away and the calculation process is then repeated. The process continually repeats until a time T when the adders are either read out to the operator or are put into a computer for analysis of the correlation function.

It is to be appreciated that the multiplication may also be accomplished using adders and by doing successive adds. In this way it is possible to eliminate the separate multipliers since the adders are controlled to provide for successive adders so as to produce the effect of multiplication. The prior art type of correlation described above which uses simultaneous calculation on all of the coefficients of the correlation function has a number of drawbacks. In particular, the electronics for providing the multiplication and addition must be repeated the same number of times as the number of coefficients. For example, if there are 64 coefficients in the correlation function then the electronics must be repeated in each of the 64 channels. This type of equipment is obviously expensive since a large quantity of electronics is necessary.

Another drawback is that there are a number of cases where it is not desirable to have the same time spacing $\Delta\tau$ between coefficients. For example, the correlation function to be analyzed may be the sum of two exponentials and in order to find the decay time for each exponential it is necessary to use different clock periods, $\Delta\tau$, for determining different portions of the correlation function. If the electronics for calculating is individually provided for each of the large number of correlator coefficients, then it is necessary to use the same spacing between channels.

Another type of prior art correlator provides for a single channel in which the time delay represented by that channel may be varied. In this type of prior art correlator, after each sample is taken, then a product and sum computation is performed on that channel before another sample is taken. This type of prior art correlator is very slow and takes a long time to build up a correlation function and would generally be too slow in operation for the purposes of the present invention.

The present invention provides for a correlator which time shares the electronics for a relatively small number of channels (n), for example 8, to form a correlation function having a large number of coefficients (M), for example 64. With the correlator of the present invention the correlator includes the capability of using different clock rates for different portions of the correlator function. In general, the device of the present invention uses the n channel correlator preceded by a temporary storage device and which provides outputs at different time periods so that the overall device can calculate the M-coefficient correlation function. In general, the device of the present invention time shares the n-channel correlator to form the M-coefficient correlation function where $n > 1$ and $M > n$.

The correlator of the present invention generally has a configuration including the n-channel correlator preceded by the temporary storage device and with the temporary storage device providing for a controllable delay. The output from the n-channel correlator is fed to a computer, which computer also controls the clocking of data from the n-channel correlator for computation and also controls the clocking of data from the temporary storage device at predetermined time periods. In this way, the n-channel correlator provides correlation for n channels at a time and with this occurring a multiple of times to build up a correlation function over the large number of coefficients M. The clocking of data from the temporary storage device may be controlled to provide for different clock rates for different n-channel groups. In this way, different portions of the correlation function may be subject to different clock rates to expose different properties of the correlation function.

If the correlator of the present invention is used as a cross correlator, then a first data input would be provided to the temporary storage device and with the output of the temporary storage device used as one data input to the n-channel correlator. A second data input could be applied directly to the n-channel correlator to provide for the cross correlation between the two data inputs. If the device is used as an auto correlator then the same data would be provided as an input to both the temporary storage device and the n-channel correlator so as to provide for auto correlation of the data.

The device of the present invention is disclosed with different system configurations including particular structures for providing the temporary storage and for providing the variable clocking of the temporary storage device. In addition, the present invention may include producing the correlation function by providing for various relationships between the n-channel correlation groups. A clearer understanding of the invention will be had with reference to the following descriptions and drawings wherein.

Generally the present invention provides for a device which time shares a small number of channels of electronics to produce a large number of correlation coefficients. For each coefficient in a correlation function it is necessary to provide the following calculation:

$$C(\tau) = \sum_{O}^{T} I(t) \cdot I'(t + \tau)$$

where T is the running time.

In a cross correlator the function data I and I' are from separate devices. In an auto correlator the function data I equal I' so that in the auto correlator the function is multiplied times itself but shifted in time by the total amount $\tau$. With the present invention, the correlator may be used as either a cross correlator or an auto correlator.

In the general applications of correlators it is desirable to produce a correlation function $C(\tau)$ for various values of $\tau$. For example, in the prior art, correlators have been designed having large numbers of individual channels, for example 64. The standard method in the prior art is to do the calculations on all coefficients of the correlation function simultaneously and with all coefficients separated by the same amount $\Delta\tau$. A general diagram of a correlator is shown in FIG. 1 and such correlator may include a shift register 10 having a number of shift positions N representing the number of channels to produce the N-coefficient correlation function.

Figure 1:
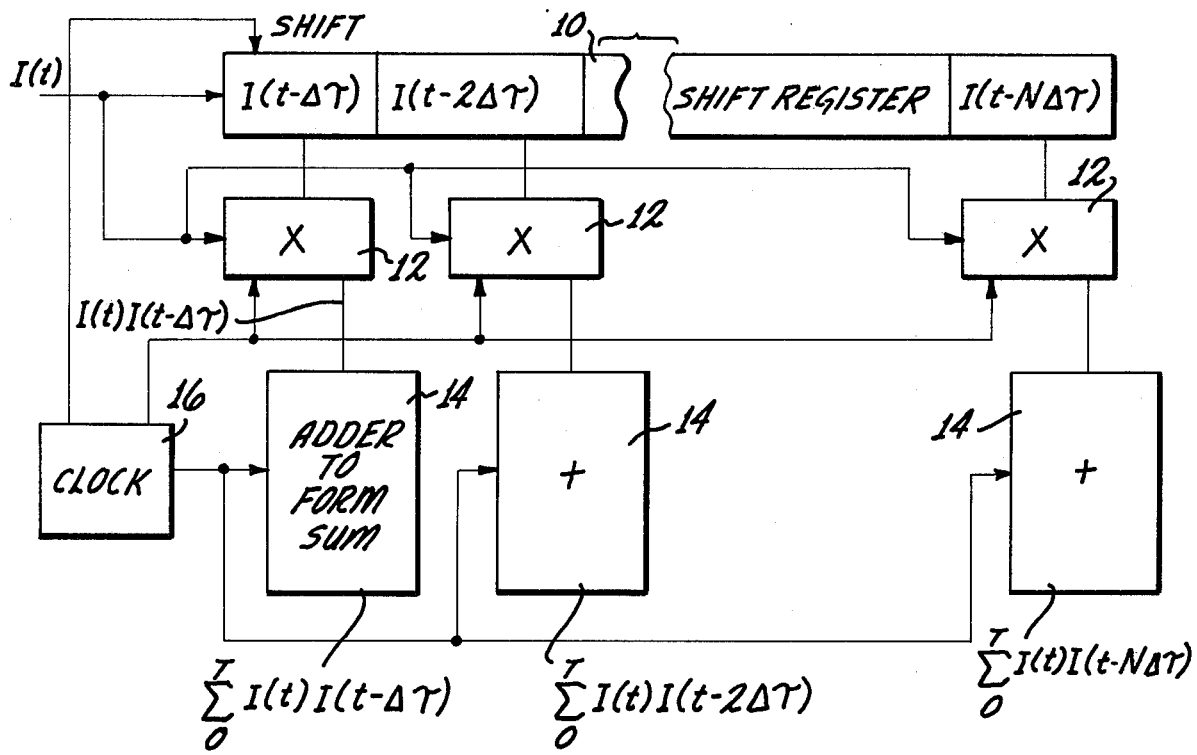
FIG. 1 illustrates a general configuration for a correlator and in particular showing a correlator in an auto correlator configuration.
Figure 2:
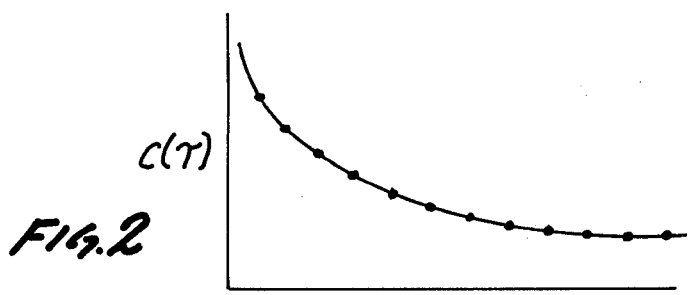
FIG. 2 illustrates a plot of an output function provided by the auto correlator of FIG. 1.

In FIG. 1 the correlator is shown in an auto correlator configuration and with the input I(t) supplied to both the shift register 10 and to a plurality of multipliers 12. The output from the shift register 10 at each shift position is multiplied by the appropriate multiplier 12 with the current incoming information I(t). The outputs from the multipliers 12 are then added in each channel by an adder 14 so as to form from the adders 14 a series of signals shown in FIG. 1, each representing coefficient in the auto correlation function at a particular delay $\tau$. The output signals from the adders 14 may then be plotted as shown in FIG. 2 to provide for a display of the correlation function.

The shift register 10, multipliers 12 and adders 14 are controlled in accordance with an output from a clock 16 and with the clock rate $1/\Delta\tau$ set to give out pulses every $\Delta\tau$. Generally as described above, the correlator operates with the following sequence as controlled by the clock pulses. The individual multipliers 12 multiply the present input I(t) times the inputs which existed during the previous N periods (where N represents the number of channels) of the clock. This, therefore, forms the product for N values of $\tau$. The adders 14 then add the results from the multipliers into N on-going sums.

The data from all of the individual channels in the shift register are moved by one (1) position with the Nth channel being thrown away and the present data being put into the first channel. After each time period $\Delta\tau$ the process is repeated until a time T when the adders 14 are either read out to an operator as shown by a display of the correlation function as illustrated in FIG. 2 or the output from the adders 14 may be put into a computer for analysis of the correlation function.

It is to be appreciated that the generalized correlator shown in FIG. 1 may represent prior art correlators if the shift register and the other components provide for a large number of channels such as 64 channels. However, the generalized showing of the correlator in FIG. 1 may also be used to represent the type of correlator used in applicant's device. In applicant's device the correlator may have a relatively small number (n) of channels such as 8 and with these n channels time shared so as to produce a large number (M) of correlation coefficients such as 64.

Figure 3:
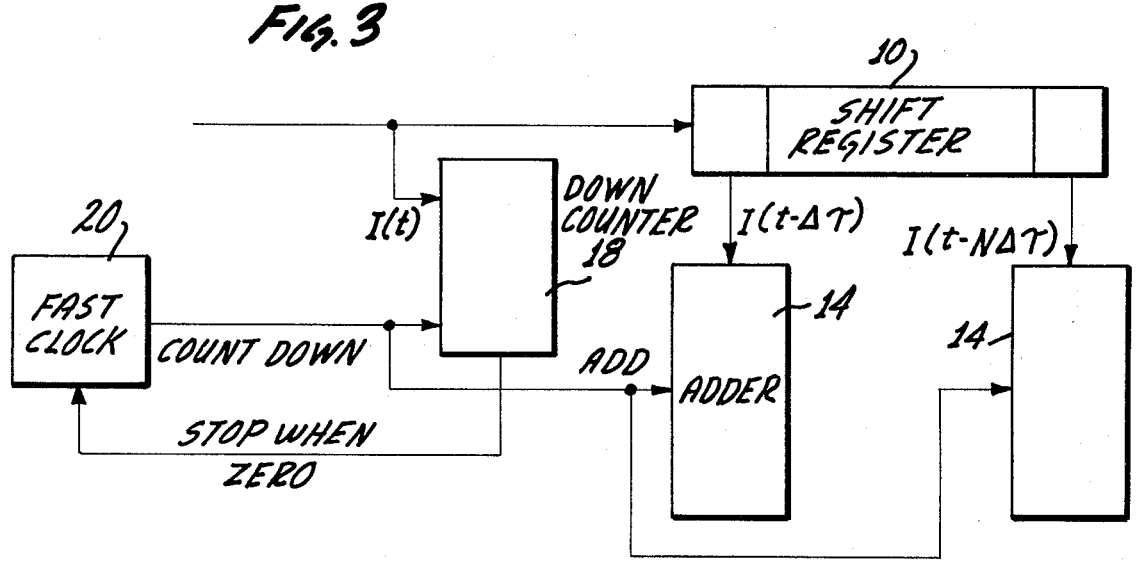
FIG. 3 illustrates a general configuration for a simplified auto correlator using adders only.

It should also be noted that it is possible to eliminate the multipliers 12 and provide the multiplication by using only the adders 14. Specifically, this may be provided by having the adders 14 providing successive adds. This may be seen with reference to FIG. 3 wherein the outputs from the shift register 10 at the various shift positions are supplied directly to the adders 14. As can be seen in FIG. 3 the present data I(t) are applied both to the shift register 10 and also to a down counter 18. A fast clock 20 provides a countdown signal which is applied both to the down counter 18 and is also applied as a clock signal to the adders 14 to control the adders to add each time the countdown signal is received.

The data from the shift register are therefore supplied a number of times to each adder and each time the down counter 18 is counted down the individual adders 14 provide an add. The down counter is counted down to zero at which time the process stops. The plurality of additions must occur during the period $\Delta\tau$, but as long as the clock 20 provides for the countdown at a proper speed the proper number of additions may occur within each $\Delta\tau$ period so that the adders 14 alone may provide for the sum. This technique may also be used with the correlator of the present invention.

Figure 4:
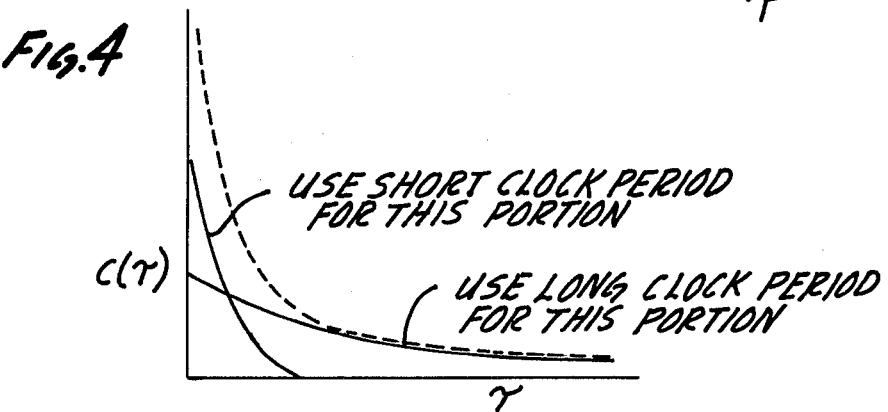
FIG. 4 illustrates a plot of a correlation function formed by two exponential functions.

The general correlator described above using a large number of channels such as 64 channels has several deficiencies. First, the electronics for multiplying and adding information must be repeated the same number of times as the large number of channels. In addition, in many cases it is not desirable to use the same time spacing $\Delta\tau$ between channels. For example, in some cases the correlation function is the sum of two (2) exponentials and in order to find the decay time for each exponential it may be desirable to use different clock periods for different portions of the correlation function. This may be seen for example with reference to FIG. 4 where a correlation function shown in dotted lines is composed of the two different exponentials shown in solid lines.

With the present invention the correlator time shares the electronics for the small number (n) of channels, for example 8, to form the large number (M) of coefficients in the correlation function, for example 64, and also has the capability of providing different clock rates for different portions of the correlation function. In general the correlation device of the present invention uses the n channel correlator where n is greater than 1 (n>1) preceded by a temporary storage device and where the time delay from the input to the output of the temporary storage device is varied so that the correlation device can calculate the M channel correlation function where M is greater than n (M>n).

As described above, one type of prior art correlator includes a single channel of data and with the data fully operated on before another data sample is taken. This type of prior art device is very slow in operation and takes a long time to build up a correlation function. In the present invention, the data are taken continuously and the device does not stop the data sampling to wait for the multiplication and add for the individual channels. The present invention therefore provides for the calculation of the correlation on more than one channel at a time, but less than the total number of correlation coefficients. The present invention therefore provides for expanding the n-channel correlator to form a M coefficient correlation function where M>1 but where n<M.

Figure 5:
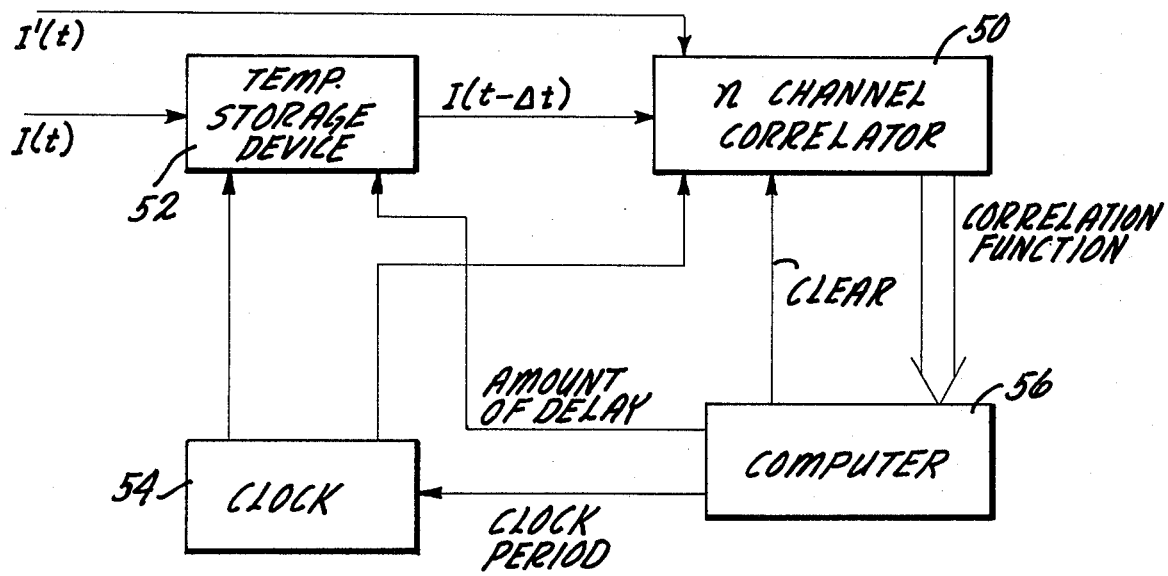
FIG. 5 is a general configuration for a correlator constructed in accordance with the teachings of the present invention.

FIG. 5 illustrates a correlator constructed in accordance with the teachings of the present invention. The correlator of FIG. 5 includes an n-channel correlator 50 which receives as a first input data designated as I'(t). Second data I(t) are applied to a temporary storage device 52. The output I(t−$\Delta$t) from the temporary storage device 52 is then applied as a second data input to the n-channel correlator 50. It is to be appreciated that the configuration as shown in FIG. 5 is generalized and if the device is to be operated as an auto correlator then I'(t) equals I(t). A clock 54 provides for a clock signal to the temporary storage device 52 to control the release of output information from the temporary storage device. In addition, the clock 54 provides for a clock signal to the n-channel correlator 50 to control the operation of the correlator 50.

The outputs from the n-channel correlator 50 are applied to a computer 56 which computer provides for analysis of the correlation function. In addition the computer 56 provides for various control signals for the n-channel correlator 50, the temporary storage device 52 an the clock 54. In particular the computer 56 may provide for a signal to control the period of the clock 54 so as to provide for a different clock rate for different portions of the correlation function. In addition, the computer 56 may provide for a signal to control the amount of delay $\Delta$t which the variable storage device provides, at different times, to the input signal supplied to the n-channel correlator 50.

As shown in FIG. 5, the temporary storage device is set to provide for a first particular delay $\Delta$t and the n-channel correlator 50 therefore calculates the correlation function for the plurality of coefficients at $\Delta$t+$\Delta\tau$, $\Delta$t+2$\Delta\tau$, $\Delta$t+3$\Delta\tau$, ... $\Delta$t+n$\Delta\tau$. After a period of time $\Delta$T the n channels of correlated data are read into the computer 56 and the delay $\Delta$t is then changed by the computer so that the temporary storage device 52 provides for a new delay $\Delta$t'. At this time, the computer 56 may also control the clock 54 so as to change the clock period to $\Delta\tau'$ or the clock period may remain the same. Assuming that the clock period is changed to $\Delta\tau'$ the n-channel correlator 50 then calculates the correlation function for the coefficients of $\Delta$t'+$\Delta\tau'$, $\Delta$t'+2$\Delta\tau'$, ... $\Delta$t'+n$\Delta\tau'$. The above procedure is then repeated until the plurality of n-channel correlation groups form the coefficient correlation function.

Figure 6:
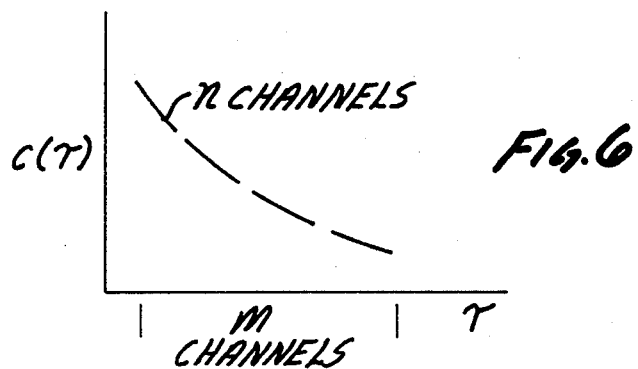
FIGS. 6, 7 and 8 illustrate plots of particular correlation functions provided by the correlator of the present invention and illustrating different methods of building up a correlation function from a plurality of sequential channel groups.

The M-coefficient correlation function may be formed by sequential n channel groups, as shown in FIG. 6. In FIG. 6 the individual n channel groups follow one another and are adjacent to each other. Also, the M-coefficient correlation function may be formed by sequential n-channel groups with one or more gaps between particular n-channel groups. This may be seen in FIG. 7 where large gap m is provided so that some of the n-channel groups are out on the tail end of the correlation function. This is useful when it is desirable to calculate a constant portion of the correlation function such as when the correlation function includes a baseline and the constant represents that baseline.

Figure 8:
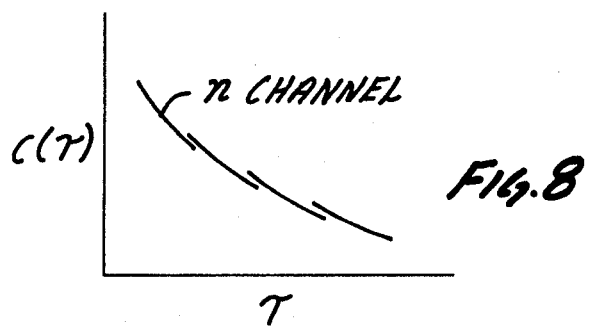
Figure 9:
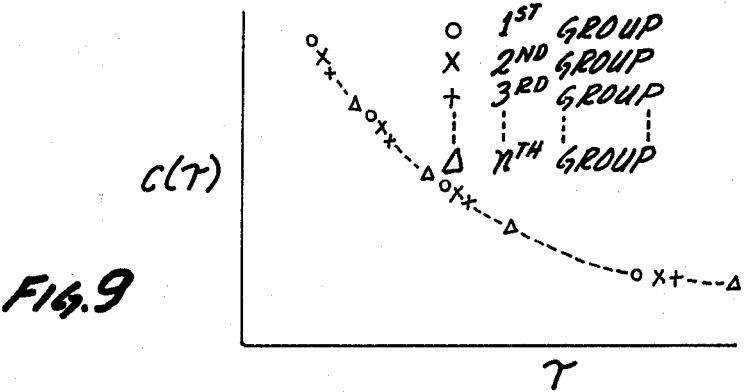
FIG. 9 illustrates a correlation function provided by the correlator of the present invention and including interleaving the channel groups.

It may also be desirable to overlap the n-channel groups, as shown in FIG. 8, so as to provide for a check of the continuity of the correlation function. Another alternative would be to interleave the n-channel groups, as shown in FIG. 9, and with each interleaved group represented by the various symbols shown in FIG. 9. If the groups are interleaved as shown in FIG. 9, it would not be desirable to change the clock rate between groups.

Figure 10:
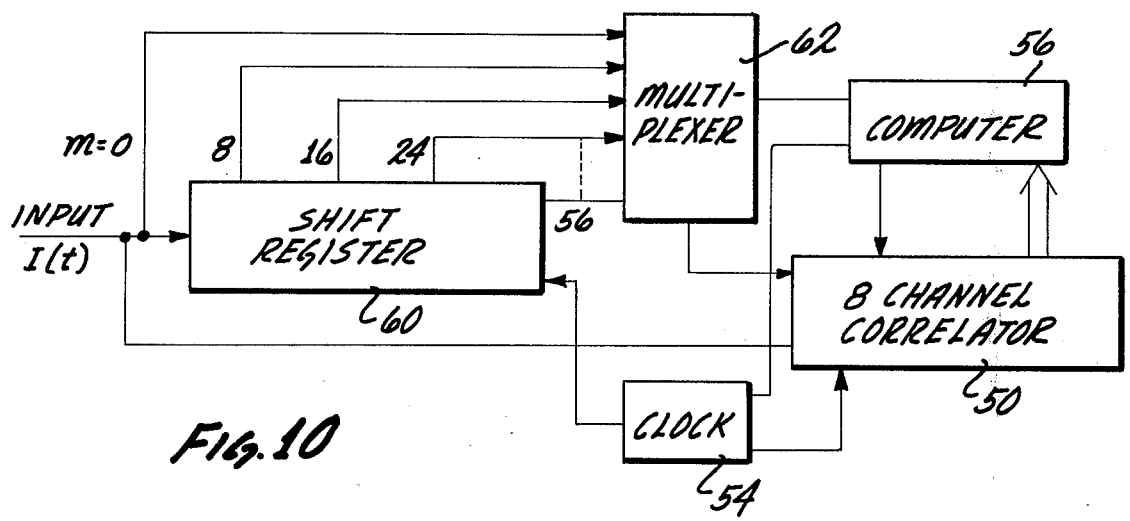
FIG. 10 illustrates a first embodiment of a temporary data storage device which may be used to form part of the correlator of the present invention.
Figure 11:
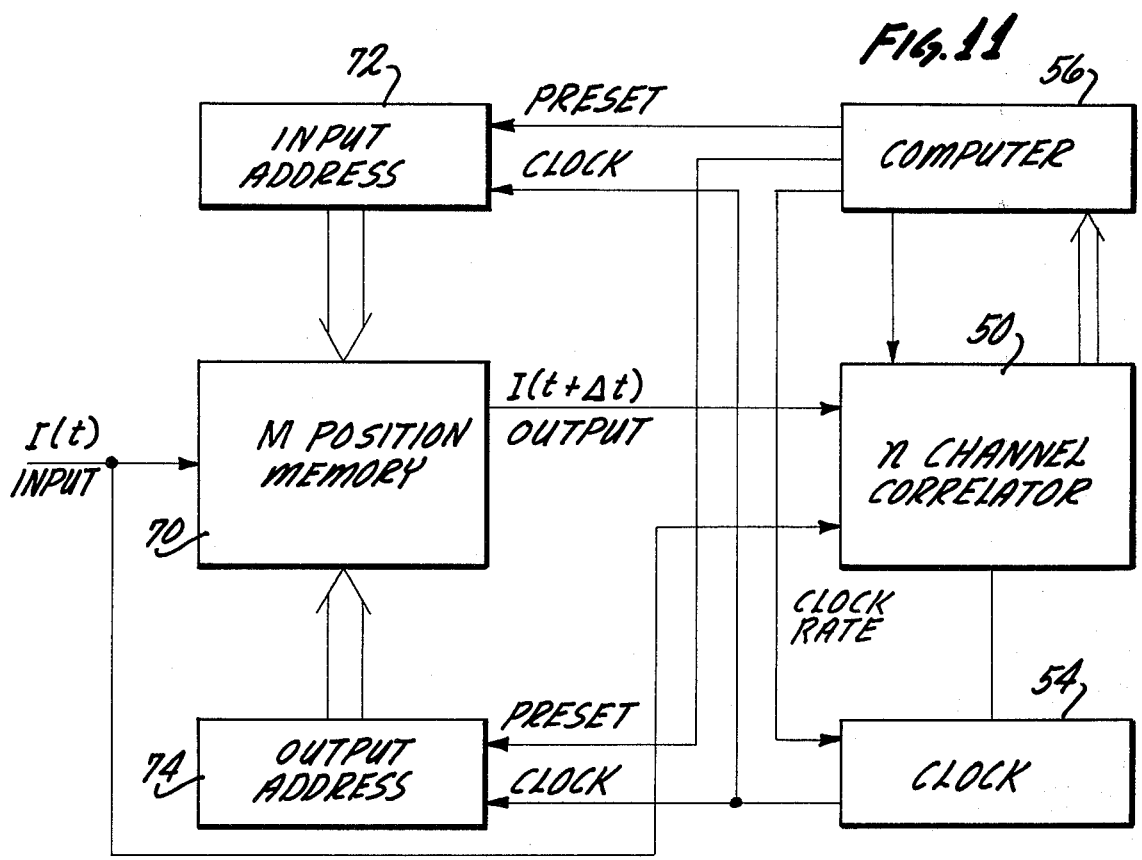
FIG. 11 illustrates a correlator constructed in accordance with the teachings of the present invention and including a second embodiment of a temporary data storage device.

The present invention may incorporate various structures for providing for the temporary storage device 52 shown in FIG. 5. FIGS. 10 and 11 illustrate correlators of the present invention incorporating two such structures for providing for the temporary storage device. In particular FIGS. 10 and 11 illustrate structures which provide for temporary storage when the input data are presented in digital form.

As a first example shown in FIG. 10, the temporary storage device may then be formed using a shift register 60 in combination with a multiplexer 62. The remaining portion of the correlator of FIG. 10 includes the n-channel correlator 50 which is shown in FIG. 10 to have eight channels. The correlator of FIG. 10 also includes the computer 56 and the clock 54. The shift register 60 receives the input data and with each clock period the shift register receives a new piece of data from the input and shifts all the other data in the shift register one position. The shift register 60 is shown to include m shift positions and with taps provided at a plurality of the output shift positions. For example, as shown in FIG. 10, the shift register 60 includes taps at the shift positions where m=0; m=8; m=16; m=24; ... m=56. The shift register 60 therefore provides for a total of eight tap positions and with each tap position providing a group of eight channels so as to provide for a total of 64 coefficient in the correlation function.

As the data are taken out at the mth tap position in the shift register, then the data at that mth tap position are delayed by $m\Delta\tau$ from the input data. Since the shift register has taps at the different positions along the length of the shift register, then as the data are selected at particular tap possitions this provides for a delay in the data by various time periods relative to the input data applied to the shift register. The particular tap position used as the input of the delayed data to the correlator 50 is controlled by the multiplexer 62. The multiplexer 62 may step through the tap positions at a particular rate or as shown in FIG. 10 may be controlled in accordance with a controlling signal supplied by the computer 56. In particular, computer 56 provides for the control of the selection of the tap position in a particular sequence and at a particular rate and coordinates the selection with the other control signals supplied by the computer 56 to the correlator 50 and the clock 54. The clock 54 can be a variable-rate clock whose rate is controlled by the computer 56.

In the particular example shown in FIG. 10 the correlator 50 is an 8-channel correlator and the shift register is a 56-position shift register with taps at each eighth shift position. As indicated above, this combination is used to produce a 64-coefficient correlation function by correlating eight channels at a time in eight non-overlapping groups. The taps may be at different positions, for example, every sixth position, and this structure would produce the correlation function with overlapping groups, as shown in FIG. 8. The overlapping groups may be used to insure that the data are continuous from channel group to channel group by having the computer 56 providing an analysis that the overlapping channels in the adjacent channel groups agree in value.

Figure 7:
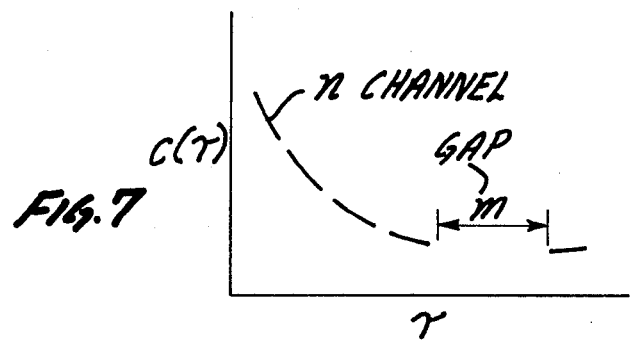

It is also possible to provide for gaps between the channel groups by placing the taps on the shift register 60 more than eight positions apart. For example, a large gap may be provided before the last channel group, as shown in FIG. 7. As indicated above, the use of the large gap is useful in determining a baseline constant such as when the correlation function is of the form $C(\tau) = Ae^{-a\tau} + B$. For large values of $\tau$ the first term in the above equation goes to zero and $C(\tau)$ is approximately equal to B, which represents the baseline. The channel group or groups that are determined after the long delay provide for a direct output measurement of the constant B. This particular type of analysis is of interest in quasi-elastic light scattering measurements where the correlation function has the above exponential form.

It is to be appreciated that in the particular form of the invention shown in FIG. 10, every time the tap position is changed through the action of the multiplexer 62 under the control of the computer 56, the 8-channel correlator 50 waits for eight clock periods after the multiplexer 62 changes tap position so that the 8-channel correlator 50 is filled up with a particular channel group of data which has been delayed the proper amount before the correlator 50 proceeds to calculate the correlation function for the particular channel group.

FIG. 11 illustrates another structure for a temporary storage device used as part of the correlator of the present invention. In FIG. 11 the temporary storage device includes an M-position memory 70 and with input and output address registers 72 and 74 for the memory 70. The computer 56 provides control of the input and output addresses 72 and 74 as well as the clock 54. The input data I(t) are put into the M position memory 70 and the input address of the data is controlled by the computer 56. Specifically, the computer 56 provides for the presetting of the relative spacing between the input and output addresses. The clock 54 is used to change the input address as successive data are entered into the M-position memory. The use of the computer 56 for presetting the spacing between the input and output addresses and the clock 54 for changing the input address allows for very fast clock times and specifically allows for clock times which are faster than is possible using the computer by itself to supply the clock signal.

The location where the data are read out of the memory 70 is controlled in accordance with the output address. The output address may, for example, be eight positions behind the input address and with both addresses 72 and 74 incremented in step every clock period. In this way, the memory 70 provides for a delay representing the period of eight channels to the input data $I(t - \Delta t)$ supplied to the n-channel correlator 50. As the input and output addresses 72 and 74 reach the maximum size of the memory 70, the addresses start over at zero so that new data is written over the old data which was received M periods before. The memory 70, therefore, always holds the last M periods of data.

The system shown in FIG. 11 is very flexible since the computer 56 can control the delay of the data provided as one input of the correlator 50 from zero delay to a delay of M clock periods simply by presetting the relative difference between the input and output addresses 72 and 74 for the memory 70. The clock 54 shown in FIG. 11 may either be a fixed rate clock and with the computer 56 providing for the control of the clock periods or the clock may be formed as a variable rate clock.

Figure 12:
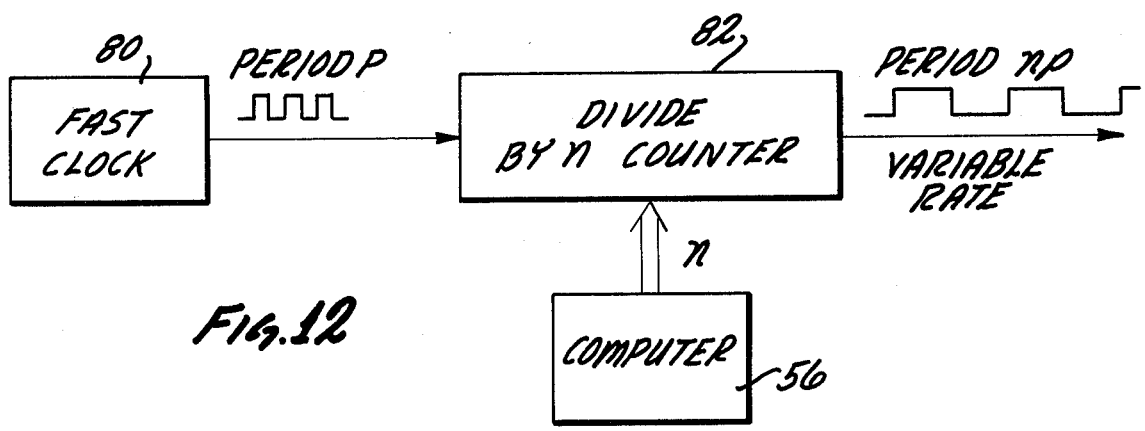
FIG. 12 illustrates a first embodiment of a variable rate clock which may be used to form part of the correlator of the present invention.
Figure 13:
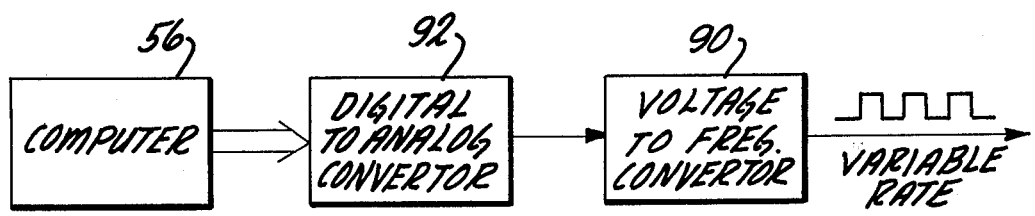
FIG. 13 illustrates a second embodiment of a variable rate clock which may be used to form part of the correlator of the present invention.
Figure 14:
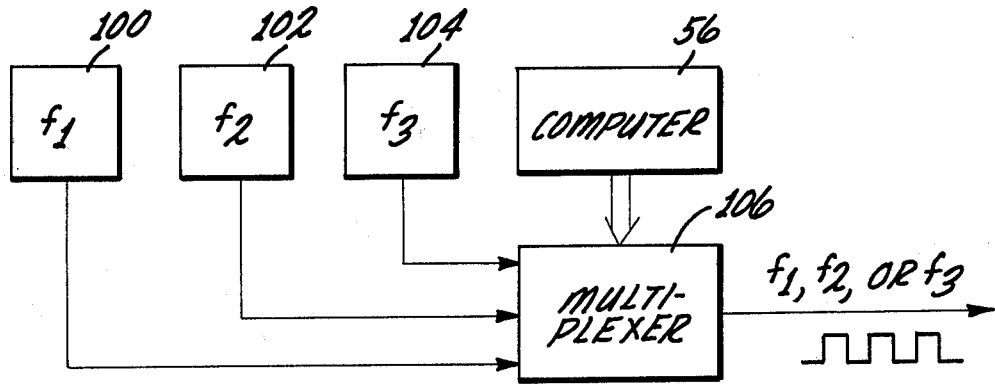
FIG. 14 illustrates a third embodiment of a variable rate clock which may be used to form part of the correlator of the present invention.

As specific examples, a variable rate clock for use with the present invention may be provided in a number of different ways. FIGS. 12, 13 and 14 illustrate three different devices for providing for the variable rate clock. In FIG. 12, the variable rate clock is provided by a fixed rate fast clock 80 whose output is run through a divide-by-n counter 82 where n may be set by a computer such as the computer 56. This provides for a variable rate output under control of the computer 56.

In FIG. 13 a variable rate clock may be provided by a voltage to frequency converter 90. A computer such as the computer 56 may provide for the control of the input voltage to the voltage to frequency converter 90 through a digital to analog converter 92. The output of the voltage to frequency converter 90 therefore has a variable rate in accordance with the voltage control provided by the computer 56.

FIG. 14 illustrates a structure for a variable rate clock which has a plurality of fixed rates provided by a plurality of individual fixed rate clocks 100, 102 and 103. The fixed rate clocks are individually fed to a multiplexer 106 and with the particular one of the fixed rates outputted from the multiplexer in accordance with a control signal from a computer such as the computer 56.

It is to be appreciated that there are other ways of forming a clock whose period is controlled, for example, by a computer such as the computer 56. The use of the variable rate clock allows the correlator of the present invention to change the clock period when switching to a different group of n channels from the temporary storage device. The computer 56 can vary the delay and the clock period, when switching to different groups of n-channels, to produce an M channel correlation function in which the n-coefficient groups are adjacent as in FIG. 6 or with gaps as in FIG. 7. It will be appreciated that both the temporary storage device, at least up to the position of data being used, and the n-channel correlator may be controlled to wait a number of clock periods so as to be filled with data at the new clock rate before the correlator starts calculating the correlator function of the new clock rate.

Alternatively, if the clock rate is not changed, then it is necessary to wait only n clock periods for the correlator to fill with data which has been delayed the proper amount by the temporary storage device, since the data in the temporary storage device have already been taken at the proper clock rate.

It is also to be appreciated that if the clock rate is changed but the system is not controlled to wait so as to allow for data to be stored at this new clock rate, this provides an error but only in the start-up period. This start-up error would be small if the data are correlated for a large number of clock cycles at the new clock rate compared to the clock periods which provide for the start-up error.

Figure 15:
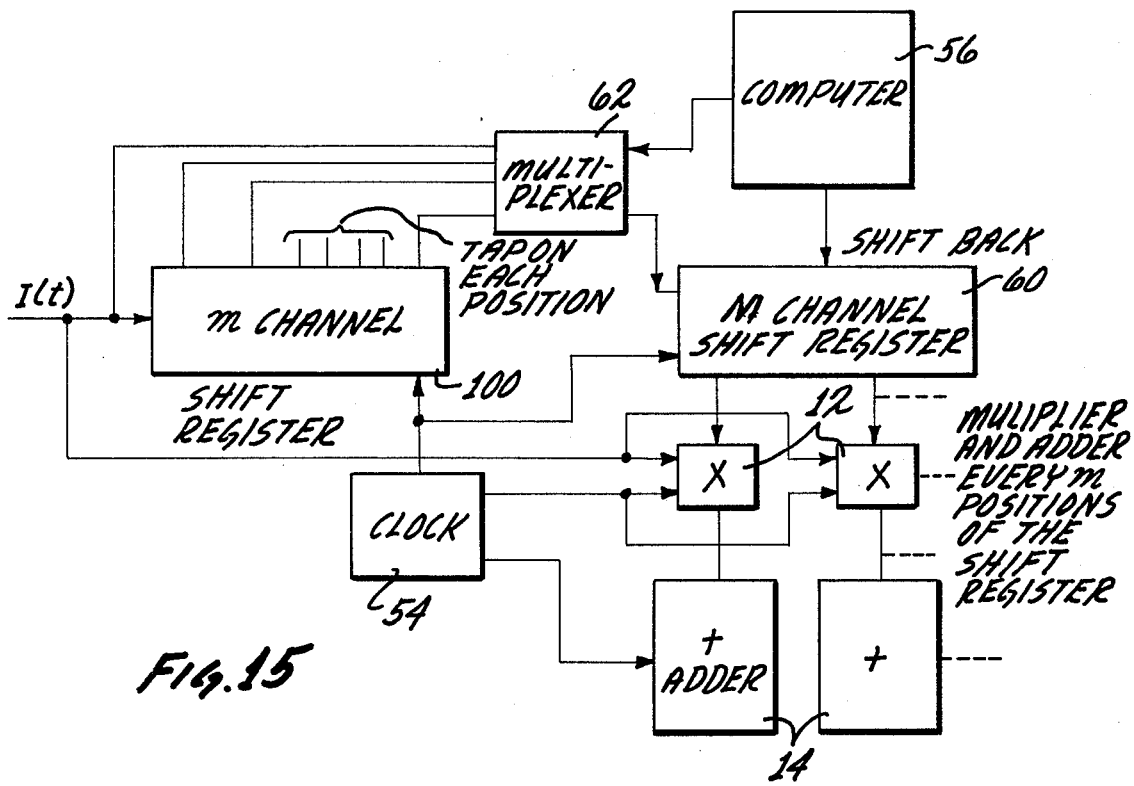
FIG. 15 illustrates one particular example of an auto correlator constructed in accordance with the teachings of the present invention.

FIG. 15 illustrates a particular form of the present invention which provides for the groups of n channels being interleaved when forming the M coefficient correlation function. In FIG. 15 the device is shown in an auto correlator configuration but it is to be appreciated that it may be also provided in a cross correlator configuration. In the device of FIG. 15 an m-channel shift register 100 (which could be the same type of shift register which is part of the n-channel correlator 50) receives the information directly and provides a plurality of output tap positions to a multiplexter such as the multiplexer 62. The multiplexer 62 is under control of a computer such as the computer 56 to provide for input signals to an M-channel shift register such as the M-channel shift register 60. The output from the M-channel shift register is supplied to a plurality of multipliers and adders such as the multipliers 12 and adders 14 and there would be n number of individual multipliers and adders. The proper sequencing of the m-channel shift register 100, the M-channel shift register 60 and the adders and multipliers 12 and 14 is under the control of a clock such as the clock 54. The number of multipliers and adders times the m channels of shift register 100 is equal to the M channels of shift register 60 (i.e. n·m=M).

It can be seen that in the device of FIG. 15 the m-channel shift register 100 and the M-channel shift register 60 are reversed in position from those shown in FIG. 10. This will therefore provide for an output correlation function in which the groups of n channels are interleaved by the operation of the shift registers 100 and 60 and in accordance with the particular tap positions on the shift registers. Specifically, the multiplexer 62 is controlled by the computer 56 to route the input data to the M channel shift register 60 and with the multipliers and adders calculating every m positions of the M channel correlation function, starting with the first point. This can be seen with reference to FIG. 9, with the circles representing the first group of n points. The multiplexer 62 is then switched to input the next position of the m-channel shift register 100 to the M-channel shift register and the device now calculates every m position of the M coefficient correlation function starting with the next point. This is shown by the X's representing the second group of n points. This continues until the mth group of points is calculated so as to provide for an interleaved correlation function.

This type of system shown in FIG. 15 may be controlled to provide for a number of advantages. For example, as the computer 56 controls the multiplexer 62 to step to the next tap, the computer 56 may also shift all of the data in the M channel shift register 60 back by one position so as to delay the data already in the shift register 60 by one period. With this type of operation there is no waiting required before providing for the correlation since the data in the shift register now has the proper delay.

With the device as shown in FIG. 15 the computer 56 may also control the multiplexer 62 so as to skip every other tap. In this way the device will calculate for only every other channel of the correlation function but in half the running time. This allos the device to provide for a trade off so as to increase the speed of correlation but at the same time reduce the number of coefficients in the correlated data.

Figure 16:
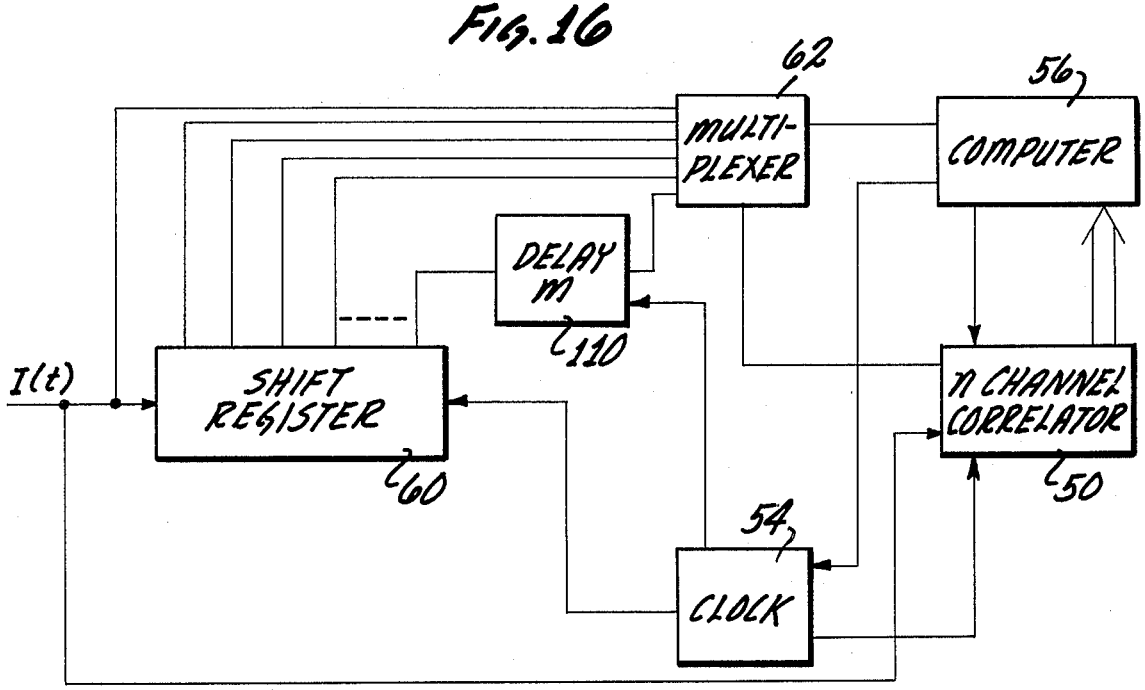
FIG. 16 illustrates another particular example of an auto correlator constructed in accordance with the teachings of the present invention and providing for both an exponential correlation function and a baseline function.

In FIG. 16 a device constructed in accordance with the teachings of the present invention provides for an additional m delay 110 which is interposed between the shift register 60 and the multiplexer 62. The device of FIG. 16 additionally provides for a relatively long delay and therefore a gap placed in front of either the last one or the last few groups of n channels of the correlator. FIG. 7 illustrates a correlation function provided by the device of FIG. 16 and, as can be seen in FIG. 7, the gap m is provided before the last group of n channels of correlation. As described above, the correlation function as shown in FIG. 7 which may be produced by the device of FIG. 16 allows for the tail portion of the correlation function to be directly measured to provide for a measurement of the baseline. This type of correlation function may be provided in the correlation of light scattering data which is a specific case of interest for the present invention.

The present invention therefore produces a correlation function with a large number of coefficients by time sharing a smaller number of channels of electronics and with the data taken continuously and operated upon for the individual channels. The present invention therefore provides for a device for having an n channel correlator produce an M coefficient correlation function wherein $n>1$ and $M>n$.

Although the present invention has been described with reference to particular embodiments, it should be appreciated that various adaptations and modifications may be made and the invention is only to be limited by the appended claims.

What is claimed is:

1. A correlator for producing a correlation function by processing input data over a large number M of correlation coefficients by time sharing a smaller number n of channels of processing electronics wherein $n>1$ and $M>n$, including
    a temporary storage device for receiving input data and for providing the input data as output data at particular successive time delay intervals relative to the input data and with each time delay interval representing at least a plurality of channels,
    an n-channel correlator comprising a storage device for storing n-channels of data, multiplying means for each channel and summing means for each channel to sum the outputs of the multiplying means, and with the n-channel correlator responsive to the output data from the temporary storage device and to additional data for correlating a group of n-channels of data where $n>1$ and for providing n output sums representing successive points of the correlation function, and
    means coupled to the temporary storage device and the n-channel correlator for controlling the coupling of the output data from the temporary storage device to the n-channel correlator to have groups of output data at the successive time delay intervals coupled to the n-channel correlator to have the n-channel correlator repetitively correlate successive groups of n-channels for providing M coefficients of correlation built up from the repetitive correlation of groups of n-channels and wherein $M>n$.

2. The correlator of claim 1 wherein the same input data in delayed and undelayed form are used as the inputs to the n channel correlator to form an auto correlator.

3. The correlator of claim 1 wherein data from different sources is used as the inputs to the n-channel correlator to form a cross correlator.

4. The correlator of claim 1 wherein each group of n channels provides for correlation of successive points in the M coefficient correlation function to have M equal n times the number of groups of n channels.

5. The correlator of claim 1 wherein each group of n channels overlaps an adjacent group of n channels to have M less than n times the number of groups of n channels.

6. The correlator of claim 1 wherein at least one group of n channels provides for the correlation of points spaced from the adjacent group of n channels to have a gap in the successive points in the M channel correlation.

7. The correlator of claim 6 wherein the gap is at the tail of the correlation function.

8. The correlator of claim 1 wherein each group of n channels provides for correlation of spaced points in the M coefficient correlation function and with the groups of n channels interleaved to form the M coefficient correlations function.

9. The correlator of claim 1 wherein the temporary storage device is formed by a shift register having output tap positions for providing the successive time delay intervals.

10. The correlator of claim 1 wherein the temporary storage device is formed by a memory with input and output addresses and with the successive time delay intervals formed by the relative spacing between the input and output addresses.

11. The correlator of claim 1 additionally including a clock and wherein the period between the channels in the correlator is controlled by the clock.

12. The correlator of claim 11 wherein the clock has a variable rate for providing a variable period between the channels in the correlator.

13. A correlator for producing a correlation function by processing input data over a large number of correlation coefficients by time sharing a smaller number of channels, including
    a temporary storage device for receiving input data and for providing the input data as output data at particular successive time delay intervals relative to the input data,
    a group channel correlator comprising a storage device for storing the group of channels of data, multiplying means for each channel and summing means for each channel to sum the outputs of the multiplying means, and with the group channel correlator responsive to the output data from the temporary storage device and to additional data for correlating the group of channels of data and for providing output sums representing points of the correlation function, and
    means coupled to the temporary storage device and the group channel correlator for controlling the coupling of the output data from the temporary storage device to the group channel correlator to have the output data at the successive time delay intervals coupled to the group channel correlator to have the group channel correlator repetitively correlate successive groups of channels for providing the large number of correlation coefficients built up from the repetitive correlation of the successive groups of channels.

14. The correlator of claim 13 wherein the successive time delay intervals provided by the temporary storage device are equal to the period between successive channels and with the group channel correlator in addition providing for delay between each channel to be correlated in an amount at least equal to a plurality of channel periods for providing for the large number of correlation coefficients built up from interleaved repetitive correlation of the successive groups.

15. The correlator of claim 13 wherein the same input data in delayed and undelayed form are used as the inputs to the group channel correlator to form an auto correlator.

16. The correlator of claim 13 wherein data from different sources are used as the inputs to the group channel correlator to form a cross correlator.

17. The correlator of claim 13 wherein each group of channels provides for correlation of successive points in the large number of correlation coefficients to have the total number of coefficients equal the number of channels in the group times the number of repetitions.

18. The correlator of claim 13 wherein each group of channels overlaps an adjacent group of channels to have the total number of channels less than the number of channels in each group times the number of repetitions.

19. The correlator of claim 13 wherein at least one group of channels provides for the correlation of points spaced from the adjacent group of channels to have a gap in the successive points in the large number of correlation coefficients.

20. The correlator of claim 19 wherein the gap is at the tail of the correlation function.

21. The correlator of claim 13 wherein the temporary storage device is formed by a shift register having output tap positions for providing the successive time delay intervals.

22. The correlator of claim 13 wherein the temporary storage device is formed by a memory with input and output addresses and with the successive time delay intervals formed by the relative spacing between the input and output addresses.

23. The correlator of claim 13 additionally including a clock and wherein the period between the channels in the correlator is controlled by the clock.

24. The correlator of claim 23 wherein the clock has a variable rate for providing a variable period between the channels in the correlator.

* * * * *